UNITED STATES PATENT OFFICE.

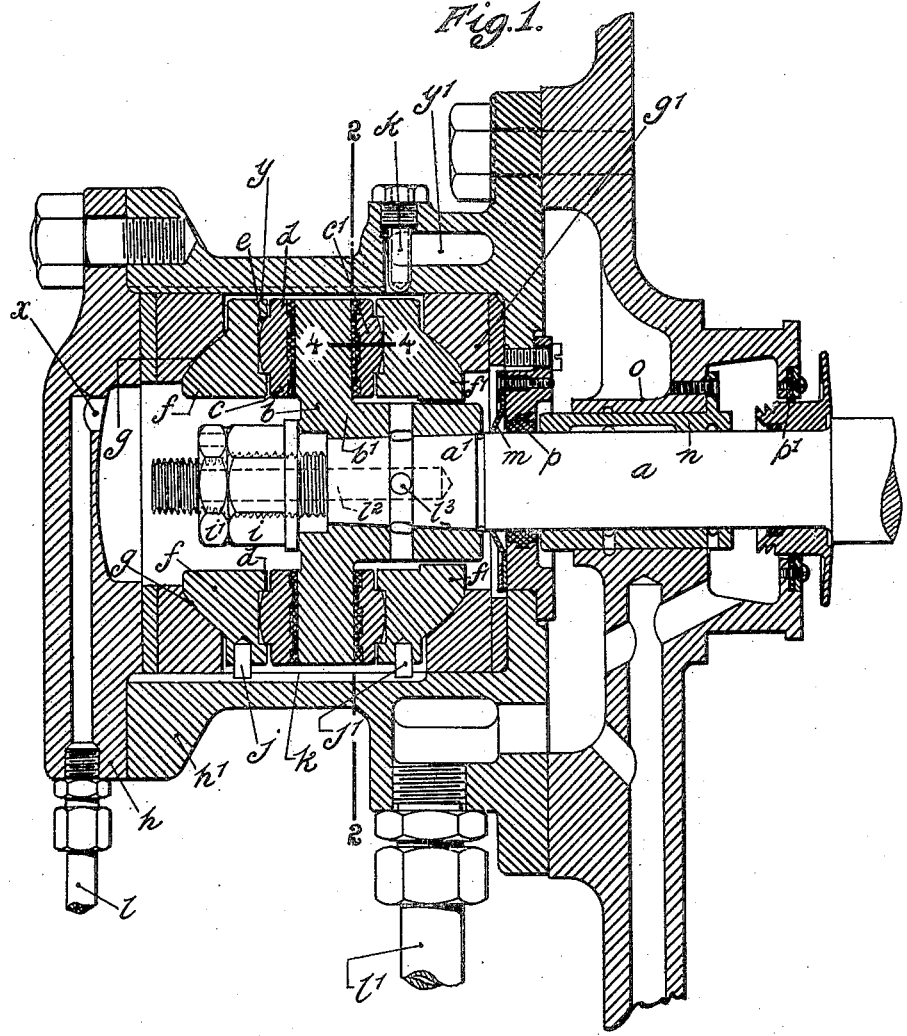

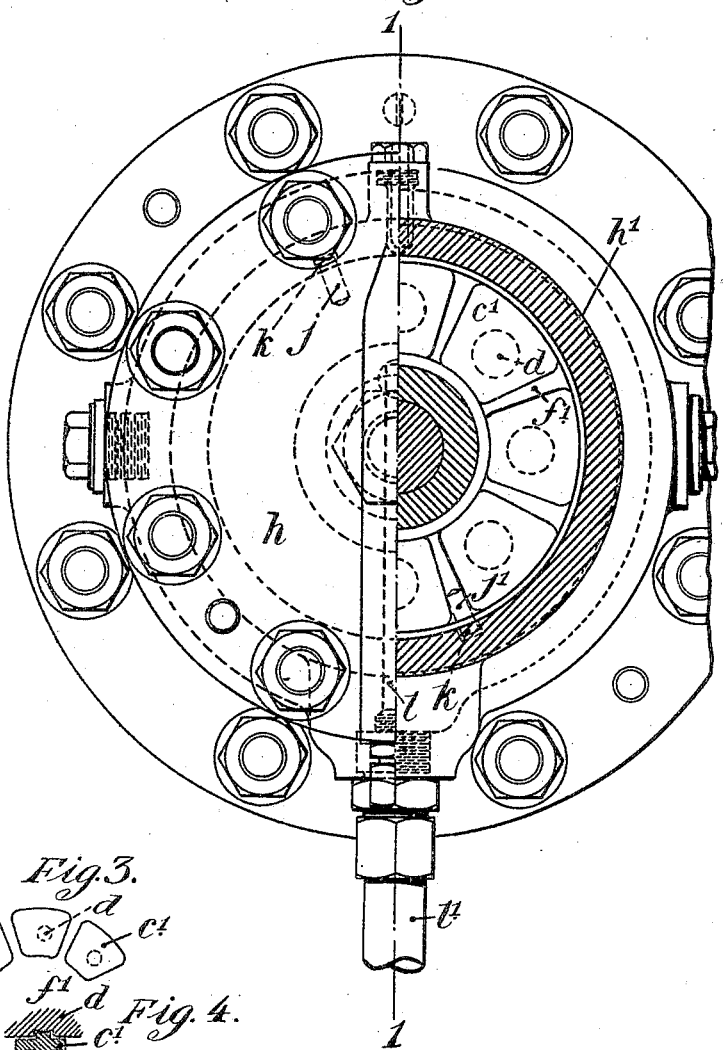
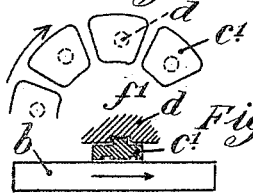
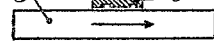

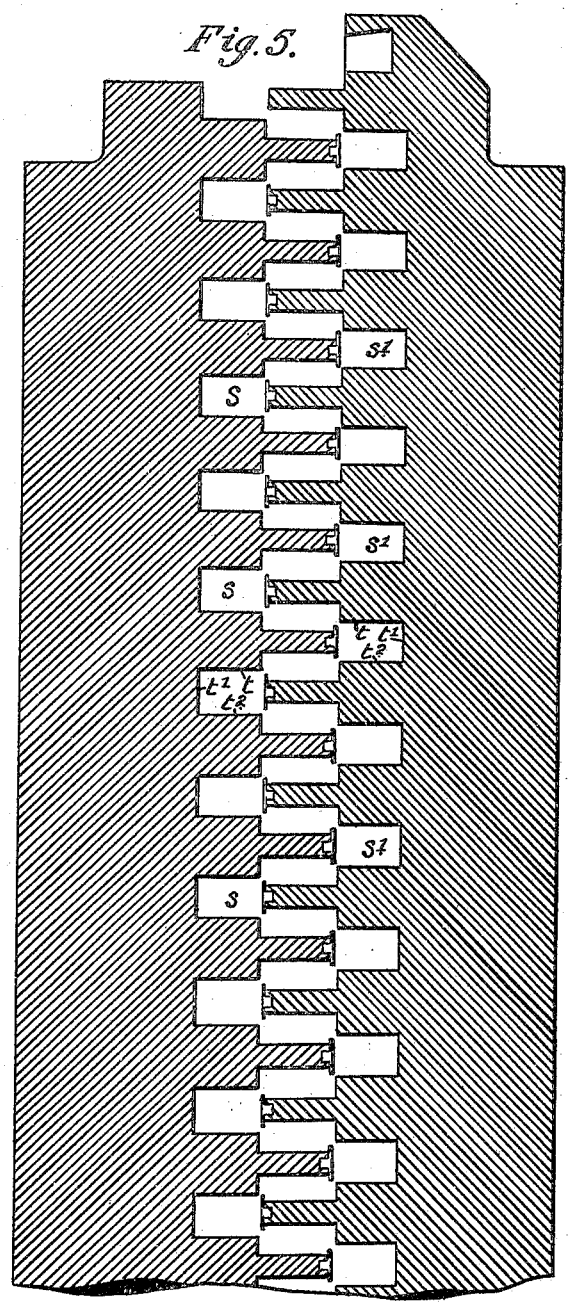

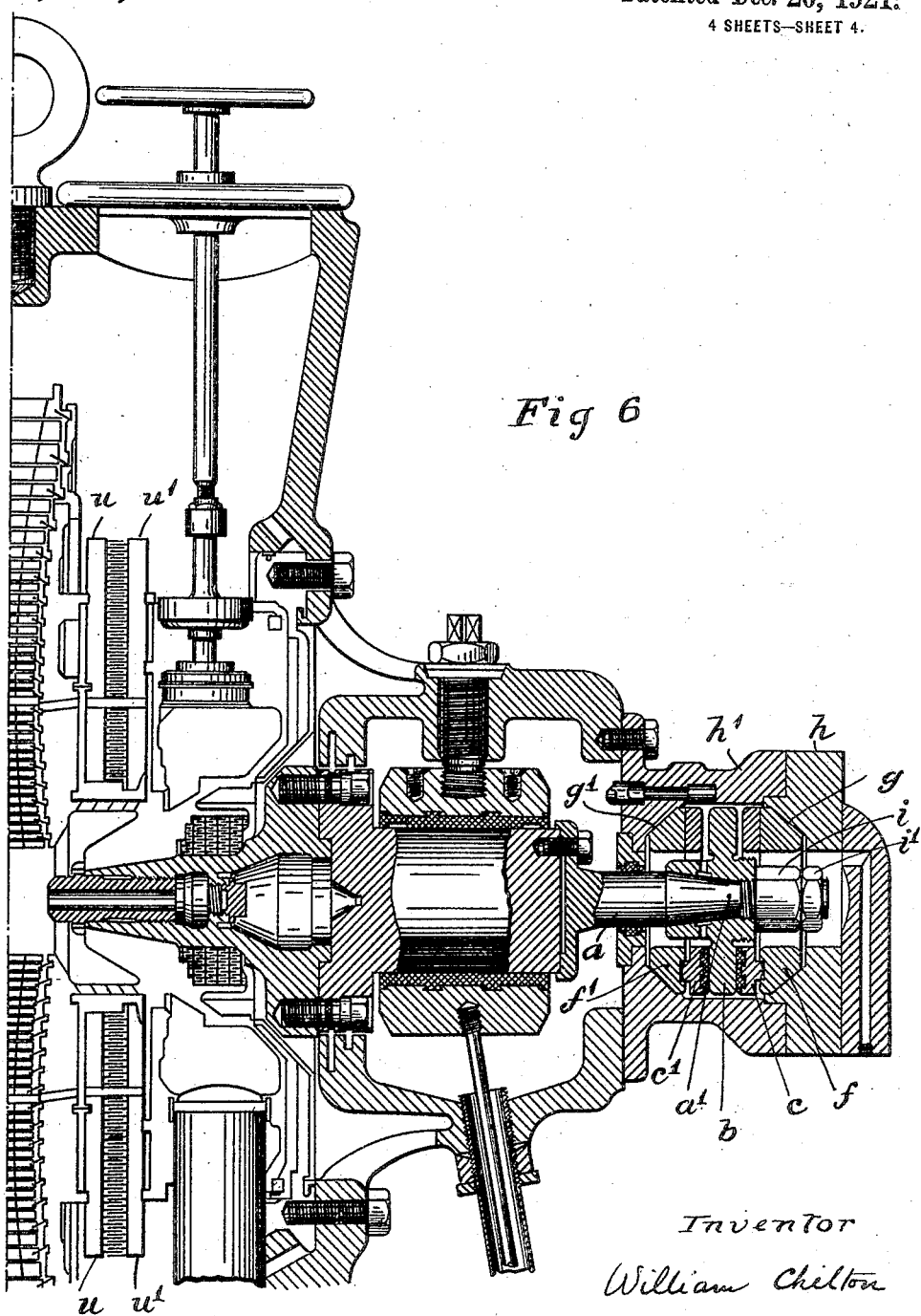

WILLIAM CHILTON, OF LOUGHBOROUGH, ENGLAND, ASSIGNOR OF ONE-HALF TO THE BRUSH ELECTRICAL ENGINEERING COMPANY LIMITED, OF LOUGHBOROUGH, LEICESTERSHIRE, ENGLAND.

TURBINE.

1,400,799. Specification of Letters Patent. Patented Dec. 20, 1921.

Application filed June 6, 1918. Serial No. 238,567.

*To all whom it may concern:*

Be it known that I, WILLIAM CHILTON, turbine designer, of Loughborough, Leicestershire, England, have invented certain new and useful Improvements in Turbines, of which the following is a specification.

This invention has for its object the improvement in methods or devices for damping or preventing axial vibrations in radial flow turbines of the Ljungstrom type and at the same time to simplify and cheapen the construction of the labyrinth balancing disks.

In the annexed drawing Figure 1 is a longitudinal section on the line 1—1 of Fig. 2 through a thrust block of the Michell type as applied to the end of the rotor shaft. Fig. 2 is a half end elevation and half section thereof on line 2—2 Fig. 1. Fig. 3 is a detail view on a smaller scale in section on line 2—2 of Fig. 1 showing the bearing segments of the thrust block and Fig. 4 is a part section on line 4—4 Fig. 1. Fig. 5 is a broken sectional view through the labyrinth disks, illustrating the improved and simplified form of section of the labyrinth passages. Fig. 6 is a longitudinal section of half of the turbine comprising the improved construction.

In turbines of this type the steam acting between and on the inner surfaces of the disks produces a heavy axial thrust tending to separate the blade disks. The axial thrust of each blade disk is balanced by two labyrinth disks, one attached to and rotating with the blade disk, the other stationary and fixed to the steam chest. Steam is admitted at the center and works its way outwardly to the circumference. The labyrinths are so constructed that a very small axial movement of the rotating portion in one direction increases the mean pressure between them, while a very small axial movement in the contrary direction decreases the mean pressure between them. By this means they are made to balance in a very accurate manner the axial thrust on the blade disks.

As the total movement to produce maximum or minimum mean pressures is extremely small the position of the labyrinth disks axially may be considered as practically fixed.

In the narrow limits however within which motion does take place, axial vibrations of fairly high frequency occur. In order to damp these vibrations it has hitherto been the practice to fit dashpots of the hydraulic or the friction type to the rotor spindles.

It has been found by experience that the dash-pots work well on the smaller sizes of turbines but that in those of larger output they fail to damp the vibration effectively.

The present improvement consists in the adaptation to the rotating member of a turbine of the Ljungstrom type, of a combination comprising a thrust block of suitable design, but preferably of the Michell type (a bearing in which the surface is divided into a number of pivoted segments which when provided with oil automatically provide pressure oil film lubrication) and a certain simplified construction of the labyrinth disks as hereinafter described.

In labyrinth balancing disks as heretofore made in this type of turbine the annular grooves in each disk, into which the annular ribs on its fellow disks project (or some of them) are formed with annular lateral recesses. The cutting off edges of these recesses are not all in one plane perpendicular to the axis, but are formed on a sloping line or plane which is not truly at right angles to the axis of rotation, and the positions of these cutting off edges have to be fixed with extreme accuracy. This and the forming of the enlarged recesses make of the labyrinths a very costly piece of work very slow to produce.

By using a suitable thrust block to control the position and the relation of the rotating parts to one another, all the grooves in the labyrinth disks can be made as plain grooves, the section of which is represented by three sides of a rectangle thus very much simplifying the disks and reducing the cost of manufacture.

Referring to the drawings;—the end of the rotor shaft $a$ is tapered as at $a^1$ to receive the interiorly tapered hub $b^1$ of the flange $b$ which forms the journal of the thrust bearing. The side faces of the flange $b$ contact respectively with two annularly arranged groups of rocking segments $c$ $c^1$ the rounded bosses $d$ of which engage with and have limited rocking movement in recesses $e$ of suitable annular bearing rings $f$ $f^1$. As shown in the drawing these bearing rings may have spherical bearing on stationary annular seats $g$ $g^1$ maintained in position by the exterior housing $h$ $h^1$ but if desired this spherical seating may be omitted. The hub $b^1$ is retained in place on the shaft $a$ by a nut $i$ with a lock nut $i^1$. The bearing rings $f$ $f^1$ are prevented from revolving by pins $j$ $j^1$ suitably disposed to engage in key ways $k$ in the housing. $l$ is the oil supply pipe supplying oil under pressure to the thrust. The oil passes from the supply pipe through the hole drilled in the cover, and enters the chamber through the opening $x$ at the top. After the oil has performed its function in the thrust, it passes into the annular space $y$ and is discharged into the annular passage $y^1$ which surrounds the casing, and is finally carried away by the drain pipe $l^1$. $k$ is a thermometer pocket to enable the final oil temperature in the discharge to be measured. The oil passes to passage $y^1$ through the annular space surrounding the thermometer pocket. $l^2$ is an oil way longitudinally through the end of the shaft $a$ and communicating with lateral outlets $l^3$ for passage of oil to the inner set of segments.

$m$ is a cup leather.

$n$ is a cylindrical bearing for the shaft $a$. $o$ a supporting member for this bearing forming also an oil chamber. $p$ $p^1$ are packings.

The segments $c$ $c^1$ are of the Michell type, their supporting bosses $d$ being disposed laterally of the center of the segmental figure as shown in Figs. 3 and 4 so that in action these segments tend to take up a slightly inclined position to the plane of the face of the flange $b$ whereby an oil film is assured between the face of the segments and the face of the flange according to the known Michell principle.

With the employment of a bearing of this type, labyrinth disks may be used of the simplified type illustrated in section in Fig. 5.

$s$ $s^1$ illustrate the grooves in the labyrinth disks $u$ $u^1$, the section of each of these grooves representing three sides of a rectangle as at $t$ $t^1$, $t^2$. The labyrinth disks $u$ $u^1$ are shown diagrammatically only, in Fig. 6.

What I claim as my invention and desire to secure by Letters Patent of the United States is:—

1. In radial flow turbines of the Ljungstrom type the combination of an axial thrust stationary bearing for the end of the rotor shaft with labyrinth disks having grooves the cross section of which shows two parallel straight lines substantially as described.

2. In radial flow turbines of the Ljungstrom type the combination of an axial thrust stationary bearing for the rotor shaft with labyrinth disks having grooves the cross section of which represents three sides of a rectangle.

3. In radial flow turbines of the Ljungstrom type the combination of an axial thrust stationary bearing of the Michell type for the end of the rotor shaft with labyrinth disks having grooves the cross section of which shows two parallel straight lines substantially as described.

4. In radial flow turbines of the Ljungstrom type the combination of an axial thrust stationary bearing of the Michell type for the rotor shaft with labyrinth disks having grooves the cross section of which represents three sides of a rectangle.

In witness whereof I have signed this specification in the presence of two witnesses.

WILLIAM CHILTON.

Witnesses:
 J. HANDS,
 CHAS. E. MORRIS.